(12) United States Patent
Wang et al.

(10) Patent No.: US 10,652,880 B2
(45) Date of Patent: *May 12, 2020

(54) FACILITATING PHYSICAL DOWNLINK SHARED CHANNEL RESOURCE ELEMENT MAPPING INDICATOR

(71) Applicant: AT&T Intellectual Property I, L.P., Atlanta, GA (US)

(72) Inventors: Xiaoyi Wang, Austin, TX (US); Ralf Bendlin, Cedar Park, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/422,068

(22) Filed: May 24, 2019

(65) Prior Publication Data

US 2019/0281589 A1  Sep. 12, 2019

Related U.S. Application Data

(63) Continuation of application No. 16/106,646, filed on Aug. 21, 2018, now Pat. No. 10,342,009, which is a
(Continued)

(51) Int. Cl.
*H04W 4/00* (2018.01)
*H04W 72/04* (2009.01)
(Continued)

(52) U.S. Cl.
CPC ......... *H04W 72/042* (2013.01); *H04L 1/1861* (2013.01); *H04L 5/0007* (2013.01);
(Continued)

(58) Field of Classification Search
CPC ........... H04W 72/042; H04W 72/1273; H04L 1/1861; H04L 5/0007; H04L 5/0044; H04L 5/0057; H04L 27/2601
(Continued)

(56) References Cited

U.S. PATENT DOCUMENTS

| 8,750,887 B2 | 6/2014 | Chandrasekhar et al. |
| 8,780,766 B2 | 7/2014 | Chen et al. |

(Continued)

FOREIGN PATENT DOCUMENTS

| CA | 2904521 A1 | 9/2014 |
| CN | 102457929 A | 5/2012 |

(Continued)

OTHER PUBLICATIONS

US 8,891,529 B2, 11/2014, Yue et al. (withdrawn)
(Continued)

*Primary Examiner* — Thai D Hoang
(74) *Attorney, Agent, or Firm* — Amin, Turocy & Watson, LLP

(57) ABSTRACT

A system employing resource element mapping for efficient use of the downlink control channel is provided for a wireless communication system. In one example, a method comprises: generating, by a base station device comprising a processor, resource element mapping signaling, wherein the resource element mapping signaling is performed per subgroup of physical resource blocks of a group of physical resource blocks; transmitting, by the base station device, a first resource element mapping pattern to a first subgroup of the group of physical resource blocks; and transmitting, by the base station device, a second resource element mapping pattern to a second subgroup of the group of physical resource blocks, wherein the first resource element mapping pattern is distinct from the second resource element mapping pattern.

20 Claims, 12 Drawing Sheets

Related U.S. Application Data continuation of application No. 15/476,852, filed on Mar. 31, 2017, now Pat. No. 10,091,777.

(51) Int. Cl.

| | |
|---|---|
| *H04L 5/00* | (2006.01) |
| *H04L 1/18* | (2006.01) |
| *H04L 27/26* | (2006.01) |
| *H04W 72/12* | (2009.01) |

(52) U.S. Cl.
CPC .......... *H04L 5/0044* (2013.01); *H04L 5/0057* (2013.01); *H04L 5/0094* (2013.01); *H04L 5/0096* (2013.01); *H04L 27/2601* (2013.01); *H04W 72/1273* (2013.01)

(58) Field of Classification Search
USPC ................ 370/328–330, 335–337, 341–349
See application file for complete search history.

(56) References Cited

U.S. PATENT DOCUMENTS

| | | | |
|---|---|---|---|
| 9,014,109 B2 | 4/2015 | Gaur et al. | |
| 9,014,115 B2 | 4/2015 | Gaur et al. | |
| 9,051,009 B2 | 6/2015 | Prohaska | |
| 9,094,145 B2 | 7/2015 | Yue et al. | |
| 9,130,725 B2 | 9/2015 | Gaal et al. | |
| 9,236,982 B2 | 1/2016 | Li et al. | |
| 9,391,805 B2* | 7/2016 | Wang ..................... | H04L 47/15 |
| 9,398,572 B2 | 7/2016 | Zhu et al. | |
| 9,425,934 B2 | 8/2016 | Seo et al. | |
| 9,635,658 B2 | 4/2017 | Papasakellariou et al. | |
| 9,699,589 B2 | 7/2017 | Novak et al. | |
| 10,091,777 B1* | 10/2018 | Wang ..................... | H04L 5/0094 |
| 10,342,009 B2* | 7/2019 | Wang ..................... | H04L 5/0044 |
| 2010/0091728 A1 | 4/2010 | Kim et al. | |
| 2011/0119568 A1 | 5/2011 | Jeong et al. | |
| 2011/0255631 A1 | 10/2011 | Pi | |
| 2013/0188531 A1 | 7/2013 | Zhang | |
| 2013/0195100 A1 | 8/2013 | Baker et al. | |
| 2013/0196675 A1 | 8/2013 | Xiao et al. | |
| 2013/0201926 A1 | 8/2013 | Nam et al. | |
| 2014/0003324 A1 | 1/2014 | Davydov et al. | |
| 2014/0177449 A1* | 6/2014 | Novak ..................... | H04W 4/70 370/241 |
| 2014/0321369 A1 | 10/2014 | Davydov et al. | |
| 2014/0348077 A1 | 11/2014 | Chen et al. | |
| 2015/0004969 A1 | 1/2015 | Han et al. | |
| 2015/0092768 A1 | 4/2015 | Ng et al. | |
| 2015/0139197 A1 | 5/2015 | He et al. | |
| 2015/0207601 A1 | 7/2015 | Kim et al. | |
| 2015/0208366 A1* | 7/2015 | Papasakellariou ........................... | H04W 74/0833 370/311 |
| 2015/0223208 A1 | 8/2015 | Park et al. | |
| 2015/0296513 A1 | 10/2015 | Nogami et al. | |
| 2015/0327095 A1 | 11/2015 | Kwak et al. | |
| 2015/0365154 A1 | 12/2015 | Davydov et al. | |
| 2016/0036571 A1 | 2/2016 | Park et al. | |
| 2016/0112099 A1 | 4/2016 | Lee et al. | |
| 2016/0135143 A1 | 5/2016 | Won et al. | |
| 2016/0192388 A1* | 6/2016 | Ekpenyong ....... | H04W 72/1284 370/329 |
| 2016/0192415 A1 | 6/2016 | Davydov et al. | |
| 2016/0248561 A1 | 8/2016 | Davydov et al. | |
| 2016/0249244 A1 | 8/2016 | Xia et al. | |
| 2016/0270038 A1 | 9/2016 | Papasakellariou | |
| 2016/0270100 A1 | 9/2016 | Ng et al. | |
| 2017/0013605 A1* | 1/2017 | Li ..................... | H04W 76/14 |
| 2017/0064678 A1 | 3/2017 | Park et al. | |
| 2017/0116552 A1 | 4/2017 | Deodhar et al. | |
| 2017/0164395 A1 | 6/2017 | Papasakellariou et al. | |
| 2017/0171690 A1 | 6/2017 | Kim et al. | |
| 2017/0223686 A1 | 8/2017 | You et al. | |
| 2017/0235848 A1 | 8/2017 | Van Dusen et al. | |
| 2017/0310435 A1* | 10/2017 | Wei ..................... | H04W 16/06 |
| 2017/0325227 A1 | 11/2017 | Li et al. | |
| 2018/0048444 A1* | 2/2018 | Park ..................... | H04L 5/005 |
| 2018/0070341 A1* | 3/2018 | Islam ..................... | H04L 1/1887 |
| 2018/0115965 A1 | 4/2018 | Takeda et al. | |

FOREIGN PATENT DOCUMENTS

| | | |
|---|---|---|
| KR | 10-2016-0078436 A | 7/2016 |
| WO | 2013/070145 A1 | 5/2013 |
| WO | 2013/096563 A1 | 6/2013 |
| WO | 2014/051356 A1 | 4/2014 |
| WO | 2016/013744 A1 | 1/2016 |
| WO | 2016/018079 A1 | 2/2016 |
| WO | 2016/070417 A1 | 5/2016 |
| WO | 2016/072784 A1 | 5/2016 |
| WO | 2016/074897 A1 | 5/2016 |
| WO | 2016/133376 A1 | 8/2016 |
| WO | 2016/182955 A1 | 11/2016 |
| WO | 2016/208991 A1 | 12/2016 |
| WO | 2017/022425 A1 | 2/2017 |
| WO | 2017/023231 A1 | 2/2017 |
| WO | 2017/031675 A1 | 3/2017 |
| WO | 2017/050153 A1 | 3/2017 |
| WO | 2017/050996 A1 | 3/2017 |
| WO | 2017/095305 A1 | 6/2017 |
| WO | 2017/095470 A1 | 6/2017 |

OTHER PUBLICATIONS

U.S. Appl. No. 16/106,646, filed Aug. 21, 2018.
U.S. Appl. No. 15/476,852, filed Mar. 31, 2017.
Maenpaa, Mikko, "Blind Detection of Interfering Cell Data Channel Power Level in 3GPP LTE/LTE-Advanced Downlink," May 2016, 92 pages. Retrieved on Jul. 11, 2016. http://dspace.cc.tut.fi/dpub/bitstream/handle/123456789/24039/maenpaa.pdf?sequence=1.
Roessler et al., "LTE-Advanced (3GPP Rel. 12) Technology Introduction White Paper," 2015, 60 pages. Retrieved on Jul. 11, 2016. http://www.rohde-schwarz.it/file/1MA252_2e_LTE_Rel12_technology.pdf.
Yang et al., "The Research on a New Method of Indicating Downlink Power Allocation through MAC Control Element in LTE System," Applied Mechanics and Materials, Trans Tech Publications, vols. 380-384, 2013, pp. 3608-3612.
Yamindi et al., "The Approach of the New Downlink Control Information Design for Transmission Mode 10," Wireless Telecommunications Symposium (WTS), IEEE, 2013, 7 pages.
"Frame Structure—Downlink," 22 pages. Retrieved on Jun. 21, 2017.http://www.sharetechnote.com/html/FrameStructure_DL.html.
International Search Report and Written Opinion received for International Application No. PCT/US2018/020753 dated Jun. 7, 2018, 15 pages.
Notice of Allowance received for U.S. Appl. No. 15/476,852 dated May 17, 2018, 24 pages.
Non-Final Office received for U.S. Appl. No. 15/343,098 dated Aug. 23, 2018, 35 pages.
Office Action dated Mar. 21, 2019 for U.S. Appl. No. 15/343,098, 17 pages.
Notice of Allowance dated Jul. 30, 2019 for U.S. Appl. No. 15/343,098, 18 pages.
Office Action dated Nov. 14, 2018 for U.S. Appl. No. 16/106,646, 12 pages.

\* cited by examiner

FIG. 6

FACILITATING PHYSICAL DOWNLINK SHARED CHANNEL RESOURCE ELEMENT MAPPING INDICATOR

RELATED APPLICATION

The subject patent application is a continuation of, and claims priority to each of, U.S. patent application Ser. No. 16/106,646 (now U.S. Pat. No. 10,342,009), filed Aug. 21, 2018, and entitled "FACILITATING PHYSICAL DOWNLINK SHARED CHANNEL RESOURCE ELEMENT MAPPING INDICATOR," which is a continuation of U.S. patent application Ser. No. 15/476,852 (now U.S. Pat. No. 10,091,777), filed Mar. 31, 2017, and entitled "FACILITATING PHYSICAL DOWNLINK SHARED CHANNEL RESOURCE ELEMENT MAPPING INDICATOR," the entireties of which applications are hereby incorporated by reference herein.

TECHNICAL FIELD

The subject disclosure relates generally to communications systems, and, for example, to systems, methods and/or machine-readable storage media for facilitating resource element (RE) mapping for efficient use of the downlink shared channel in a wireless communication system.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G standards.

BRIEF DESCRIPTION OF THE DRAWINGS

FIGS. 4, 5, 6 and 7 illustrate example, non-limiting RE mapping patterns for a single physical resource block (PRB) and that can be employed to facilitate RE mapping for efficient use of the downlink control channel in accordance with one or more embodiments described herein.

DETAILED DESCRIPTION

Figure 1:
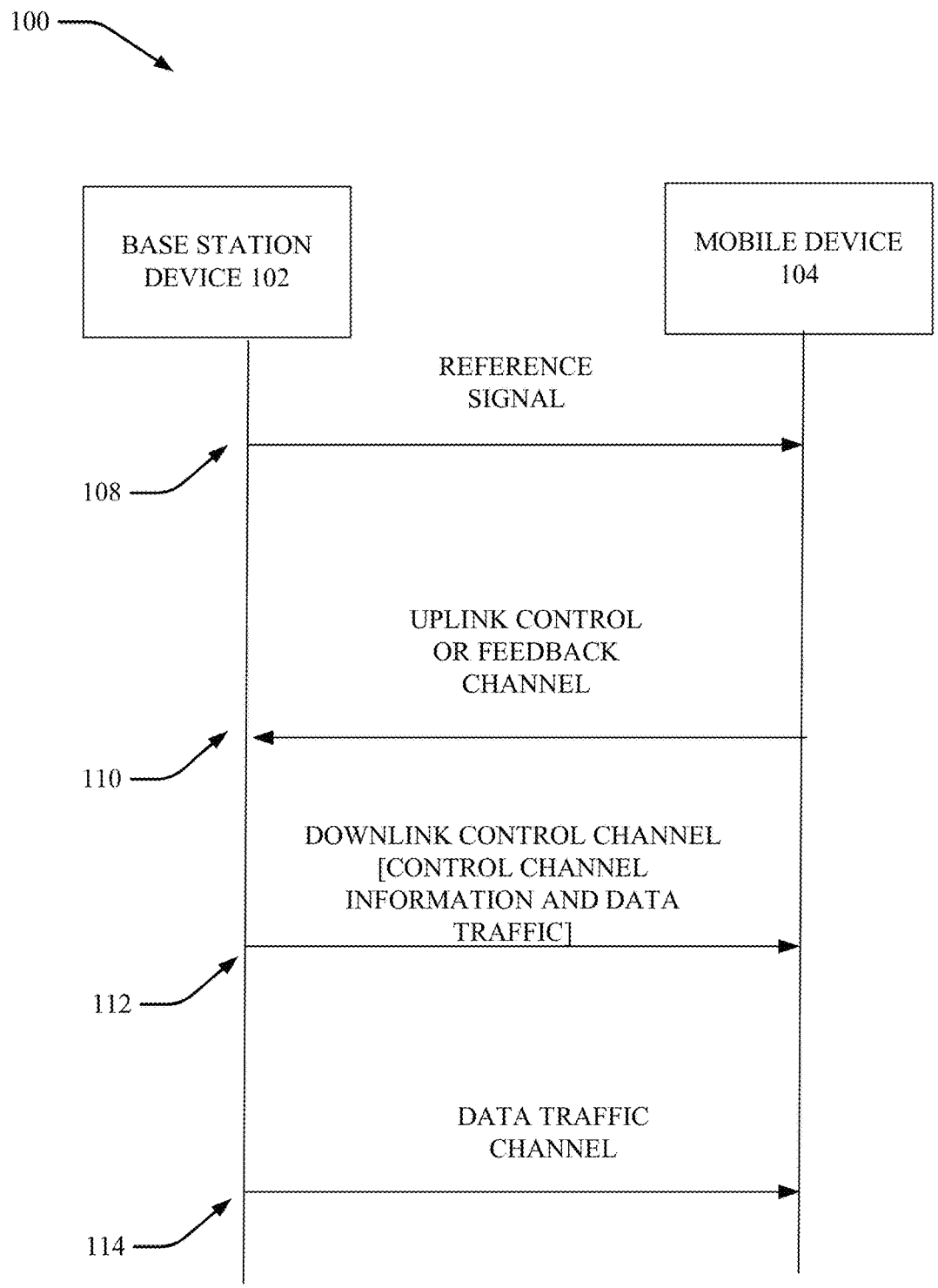
FIG. 1 illustrates an example, non-limiting message sequence flow chart to facilitate resource element (RE) mapping for efficient use of the downlink control channel in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

In some wireless communication system control frameworks, the number of resources allocated for the data channel is indicated in the control channel. The mobile device can search the region where the control channel is located (e.g., orthogonal frequency division multiplexed (OFDM) symbols) and the resource elements. In some cases, if the control channel has reserved resources, these reserved resources cannot be used for transmission of the data channel notwithstanding the reserved resources may not be in use or may not be currently needed. Waste results. In some systems, data and control information cannot be multiplexed and this also results in waste and a decrease in link/system throughput.

The LTE PDSCH RE mapping mechanism can be very efficient since it can convey a complex RE pattern using a few bits of configurations. However, the drawback is that the LTE PDSCH RE mapping mechanism typically employs an approach that utilizes the reference signal (RS) or channel RE pattern being known in the specification to the mobile device. Accordingly, the mechanism cannot be tailored to perform RE mapping around RS and/or channels formatted in forthcoming devices since the forthcoming devices may have RE patterns that are not already known.

Due to this drawback, 3GPP has introduced a new RS (e.g., channel state information-reference signal (CSI-RS)). The new RS can utilize various REs and legacy mobile devices need not be aware of the REs (as noted above). However, because legacy mobile devices would be unaware of the REs, the performance of the legacy mobile devices can be negatively affected in some cases. Therefore it is important to allow future compatibility in at least some implementations of 5G design.

Systems, methods and/or machine-readable storage media for facilitating RE mapping for efficient use of the downlink control channel in a 5G wireless communication system are provided herein. Legacy wireless systems such as LTE, Long-Term Evolution Advanced (LTE-A), High Speed Packet Access (HSPA) etc. can have downlink control channels that carry information about the scheduling grants. Typically this includes a number of multiple input multiple output (MIMO) layers scheduled, transport block sizes, modulation for each codeword, parameters related to hybrid automatic repeat request (HARQ), subband locations and also precoding matrix index corresponding to the sub bands.

Typically, the following information can be transmitted based on the downlink control information (DCI) format: Localized/Distributed virtual resource block (VRB) assignment flag, resource block assignment, modulation and coding scheme, HARQ process number, new data indicator, redundancy version, transmit power control (TPC) command for uplink control channel, downlink assignment index, precoding matrix index and/or number of layers.

As used herein, "5G" can also be referred to as New Radio (NR) access. Accordingly, systems, methods and/or machine-readable storage media for facilitating RE mapping for efficient use of the downlink control channel in a 5G wireless communication system are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

One or more embodiments described herein can include systems, apparatus, methods and/or machine-readable storage media that can facilitate RE mapping for efficient use of the downlink control channel in a 5G wireless communication system are provided herein. In particular, one or more embodiments described herein can provide a hybrid signaling method to configure PDSCH RE mapping. The hybrid signaling method can include a first type of signaling, a second type of signaling in which an RE is employed for all physical resource blocks (PRBs) and a third type of signaling that employs selection of PRBs into groups and allocation of one RE mapping pattern per PRB group. As such, in various embodiments described herein, one or more bitmaps can be employed to indicate REs (in some cases, to indicate every RE) for a PRB and provide forward compatibility for legacy and non-legacy mobile devices. In one or more embodiments, the RE mapping pattern defined for a PRB can differ from one PRB to another PRB such that all PRBs need not have the same RE mapping pattern.

In one embodiment, an apparatus is provided. The apparatus can comprise: a processor; and a memory that stores executable instructions that, when executed by the processor, facilitate performance of operations. The operations can comprise: employing hybrid channel signaling between a base station device and a mobile device of mobile devices, wherein the employing comprises: determining whether to override a first type of information transmitted for downlink channel signaling with a second type of information for the downlink channel signaling, wherein the first type of information is associated with a first physical resource block group of physical resource blocks for a first resource element mapping pattern for the mobile devices and wherein the second type of information is associated with a second physical resource block group of the physical resource blocks for a second resource element mapping pattern for a group of the mobile devices; and transmitting the second type of information to override a portion of the first physical resource block with the second physical resource block based on a scheduling decision associated with occupying selected resource elements from a physical downlink shared channel.

In another embodiment, a method is provided. The method comprises: generating, by a base station device comprising a processor, resource element mapping signaling, wherein the resource element mapping signaling is performed per subgroup of physical resource blocks of a group of physical resource blocks; transmitting, by the base station device, a first resource element mapping pattern to a first subgroup of the group of physical resource blocks; and transmitting, by the base station device, a second resource element mapping pattern to a second subgroup of the group of physical resource blocks, wherein the first resource element mapping pattern is different from the second resource element mapping pattern.

In another embodiment, a machine-readable storage medium is provided. The machine-readable storage medium can comprise executable instructions that, when executed by a processor, facilitate performance of operations, comprising: employing hybrid channel signaling between a base station device and a mobile device of mobile devices, wherein the employing comprises: determining whether to override a first type of information transmitted for downlink channel signaling with a second type of information for the downlink channel signaling, wherein the first type of information is associated with a first physical resource block of physical resource blocks for a first resource element mapping pattern for the mobile devices; and transmitting the second type of information to replace a portion of the first physical resource block with a second physical resource block.

One or more embodiments can flexibly allow per PRB based PDSCH RE mapping patterns, which means different PRBs can have different RE mapping patterns. Also, one or more embodiments can provide signaling overhead that is acceptable. For example, the signaling overhead amount can linearly increase as new RSs are introduced in future releases. In one or more of the various embodiments described herein, there is no need to have a mapping pattern for every PRB in one or more embodiments described herein.

Figure 2:
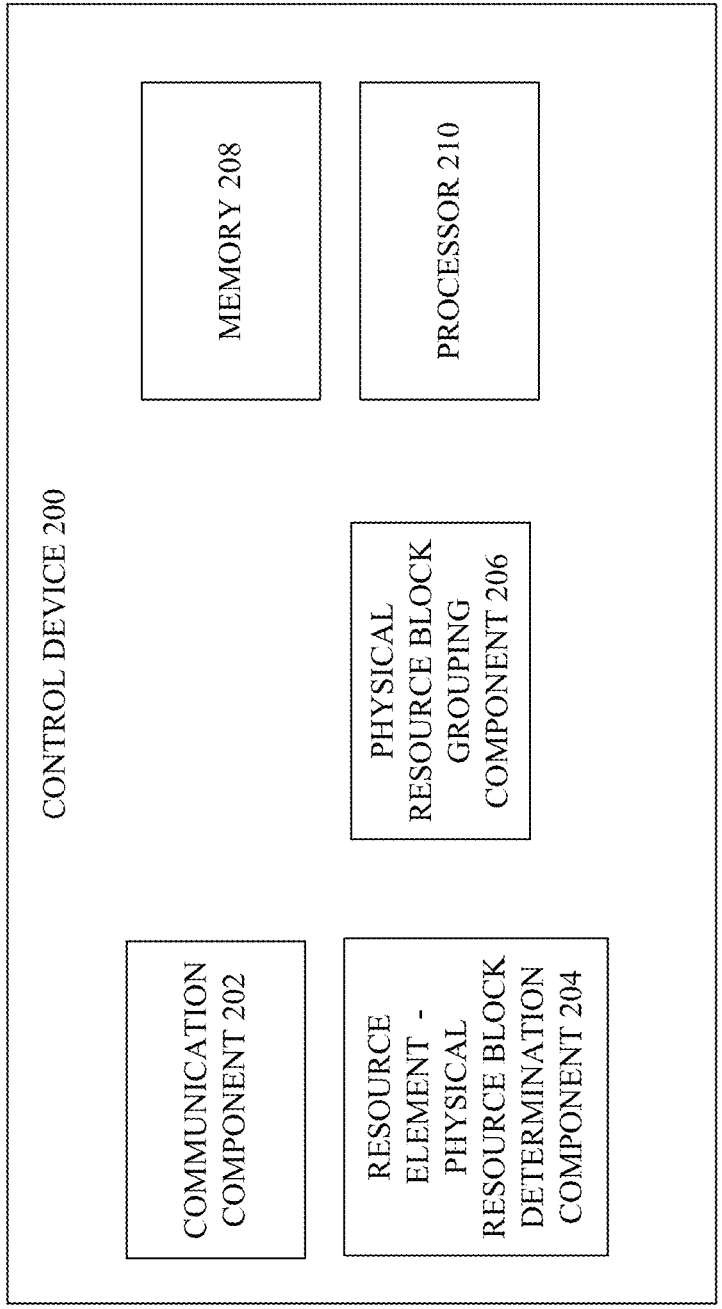
FIG. 2 illustrates an example, non-limiting block diagram of a control device that can facilitate RE mapping for efficient use of the downlink control channel in accordance with one or more embodiments described herein.
Figure 3:
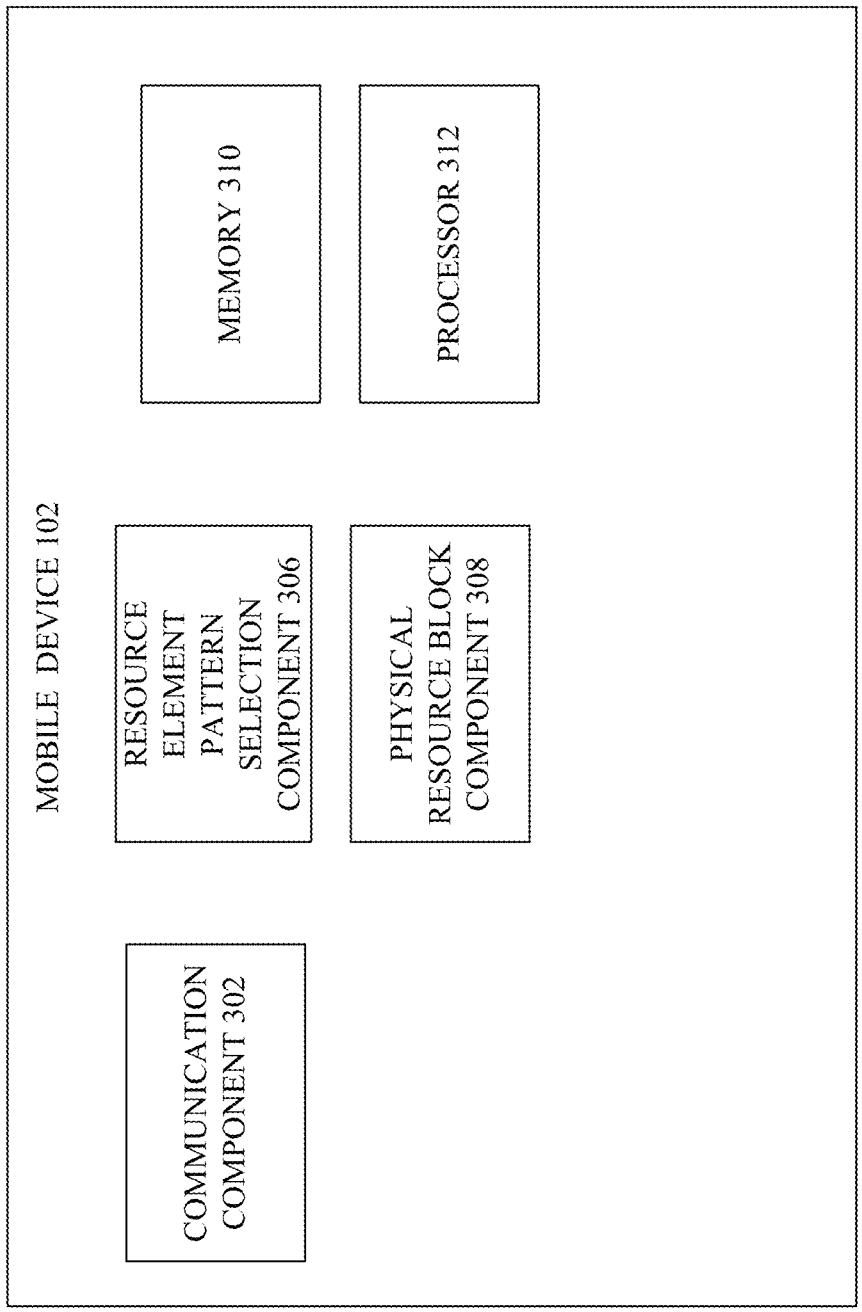
FIG. 3 illustrates an example, non-limiting block diagram of a mobile device for which RE mapping can be determined in accordance with one or more embodiments described herein.

FIG. 1 illustrates an example, non-limiting message sequence flow chart to facilitate RE mapping for efficient use of the downlink control channel in accordance with one or more embodiments described herein. FIG. 2 illustrates an example, non-limiting block diagram of a control device that can facilitate RE mapping for efficient use of the downlink control channel in accordance with one or more embodiments described herein. FIG. 3 illustrates an example, non-limiting block diagram of a mobile device for which RE mapping can be determined in accordance with one or more embodiments described herein. Repetitive description of like elements employed in other embodiments described herein is omitted for sake of brevity.

The system 100 described herein can provide for hybrid signaling of a first, second or third type, depending on the configurations and/or capabilities of the one or more mobile devices (e.g., mobile device 104) in the network. The first type of signaling includes signaling of RS information and is always performed by the system (e.g., by the BS device 102). After the first type of signaling is performed, a second type can be performed. In some embodiments, a third type of signaling can be performed to overwrite aspects signaled during the second type of signaling.

Turning to FIG. 1, one or more embodiments can enable the BS device 102 to dynamically signal the mobile device 104 to use the REs located in the control region (e.g. the first OFDM symbol in some embodiments) for data in dynamic way during the first type of signaling, for example. As used herein, dynamically signaling can mean signaling of information that can change from time to time.

In some embodiments described herein, the BS device 102 can transmit information to the mobile device 102 configuring RE mapping pattern for all of the PRBs (e.g., a single pattern for all PRBs) in second type of signaling. In some embodiments, the BS device 102 can, in the third type of signaling, group the PRBs and after grouping signal one RE mapping for the configured group, resulting in configuring different RE mapping patterns for different PRB groups. In some embodiments described herein, accordingly, the signaling is PRB-based (a signal can be transmitted to an entire PRB and/or the RE mapping can be for a particular PRB). In some embodiments, a previous configuration of RE mapping in association with one PRB for all mobile devices can be optionally overwritten to provide for multiple PRBs within the group that was initially a single PRB in the second type of signaling.

One or more embodiments can flexibly allow per PRB based PDSCH RE mapping patterns, which means different PRBs can have different RE mapping patterns. Also, one or more embodiments can provide signaling overhead that is acceptable. For example, the signaling overhead amount can linearly increase as new RSs are introduced in future releases. In one or more of the various embodiments described herein, there is no need to have a mapping pattern for every PRB in one or more embodiments described herein.

Turning back to FIG. 1 and the first type of signaling, one or more of reference signals and/or pilot signals can be transmitted as shown at 108 of FIG. 1. The reference signals and/or the pilot signals can be beamformed or non-beamformed. The mobile device 104 can compute the channel estimates then determine the one or more parameters associated with channel state information (CSI) reporting. The CSI report can comprise example channel quality indicator (CQI), precoding matrix index (PMI), rank information (RI), the best subband indices, best beam indices etc. or any number of other types of information.

The CSI report can be sent from the mobile device 104 to the BS device via a feedback channel (e.g., feedback channel 110). The BS device 102 scheduler can use this information in choosing the parameters for scheduling of the particular mobile device 104. As used herein, the term "BS device 102" can be interchangeable with (or include) a network, a network controller or any number of other network components. The mobile device 104 can send the scheduling parameters to the mobile device 104 in the downlink control channel (e.g., downlink control channel 112). After this information is transmitted, the actual data transfer can be provided from the BS device 102 to the mobile device 104 over the data traffic channel 114.

The downlink control channel can carry information about the scheduling grants. As previously discussed, typically this includes a number of multiple input multiple output (MIMO) layers scheduled, transport block sizes, modulation for each codeword, parameters related to hybrid automatic repeat request (HARQ), subband locations and also precoding matrix index corresponding to the sub bands. Additionally, typically, the following information can be transmitted based on the downlink control information (DCI) format: Localized/Distributed virtual resource block (VRB) assignment flag, resource block assignment, modulation and coding scheme, HARQ process number, new data indicator, redundancy version, transmit power control (TPC) command for uplink control channel, downlink assignment index, precoding matrix index and/or number of layers.

In some embodiments, downlink control channel can also carry data in one or more subcarriers of an OFDM control channel symbol to improve efficiency of the control channel. As shown in FIG. 1, the downlink control channel can include data or control channel information. In various embodiments, the systems described herein can provide approaches for the control channel transmission.

Turning first to FIG. 2, the control device 200 can be comprised in the BS device 102 and/or any other network control device that can generate information for control of the information to be transmitted on the downlink control channel. In one or more embodiments, the BS device 102 and/or the control device 200 can indicate the RE pattern for one or more mobile devices dynamically (e.g., via physical layer signaling, example DCI signaling) or semi-statically (e.g., higher layer or radio resource control (RRC) signaling).

The control device 200 can comprise communication component 202, RE—physical resource block determination component 204, PRB grouping component 206, memory 208 and/or processor 210. In some embodiments, one or more of communication component 202, RE—physical resource block determination component 204, PRB grouping component 206, memory 208 and/or processor 210 can be electrically and/or communicatively coupled to one another to perform one or more functions of control device 200.

The communication component 202 can transmit and/or receive control and/or data information to and/or from one or more mobile devices (e.g., mobile device 104). In some embodiments, the communication component 202 can transmit hybrid signaling including, but not limited to, RS information for one or more mobile devices. The communication component 202 can also transmit one or more RE mapping patterns for multiple PRBs (in a third type of signaling) and a RE mapping pattern for a single PRB used for all mobile devices (in a second type of signaling). For example, in the third type of signaling, the PRB grouping component 206 can determine different PRB groups and the RE-PRB determination component 204 can transmit one RE mapping pattern for determined PRB group. In the case of the second type of signaling, the PRB grouping component 206 groups all mobile devices into a single PRB and the RE-PRB determination component 204 determines one RE mapping pattern to employ for the single PRB. In the case of the third type of signaling, the PRB grouping component 206 forms more than one group thereby dividing two or more mobile devices into PRB groups and the RE-PRB determination component 204 determines one RE mapping pattern to employ for each PRB group.

The RE patterns can be two-dimensional bit maps in some embodiments. In some embodiments, there can be a two-dimensional bitmap for each physical resource block (PRB): The OFDM symbols * subcarriers for one PRB (e.g., if the number of OFDM symbols is 7 in a slot, and the number of subcarrier is 12, then the bitmap is 7 by 12). The two-dimensional bitmaps can be populated with bit values 0 and 1 to indicate whether a RE corresponding to a particular (OFDM symbol location, subcarrier location) combination can be employed for transmission of control channel information or data.

In some embodiments, if a bit value at the RE is a first value (e.g., "0"), data cannot be transmitted at that OFDM symbol location, subcarrier location; if the bit value at the RE is a second value (e.g., "1"), data can be transmitted at that OFDM symbol location, subcarrier location. Accordingly, in some embodiments, each bit in the bitmap indicates whether the subcarrier on that OFDM symbol can be used for PDSCH RE mapping or not. The bitmap can also include the symbols designed for control channels (e.g., if the first symbol is designed for control channel transmission, but the bitmap can still indicate UE to use those REs).

Accordingly, the different RE patterns can indicate control channel symbol subcarriers over which data can be transmitted and control channel symbol subcarriers over which control channel information can be transmitted. Use of traditional control channels (e.g., symbol location 0 of FIGS. 4, 5, 6 and 7) and use of traditional data channels (e.g., symbol locations 1-13 of FIGS. 4, 5, 6 and 7) can be specified in any number of configurations (and one or more different mobile devices can receive different sets of RE patterns—as such, the RE patterns can be specific to one or more different mobile devices or individualized to be unique for each mobile device).

The memory 208 can be a computer-readable storage medium storing computer-executable instructions and/or information configured to perform one or more of the functions described herein with reference to the control device 200. For example, in some embodiments, the memory 208 can store computer-readable storage media associated with determining one or more RE patterns, determining grouping of PRBs, etc. The processor 210 can perform one or more of the functions described herein with reference to the control device 200.

Turning also to FIG. 3, the mobile device 104 can comprise communication component 302, RE pattern selection component 206, PRB component 308, memory 310 and/or processor 312. In some embodiments, one or more of communication component 302, RE pattern selection component 206, PRB component 308, memory 310 and/or processor 312 can be electrically and/or communicatively coupled to one another to perform one or more functions of mobile device 104.

In some embodiments, the communication component 302 can receive information regarding one or more different RE mapping patterns and/or a particular PRB to which the mobile device. The RE pattern selection component 306 can select amongst one or more RE mapping patterns while the PRB component 308 can perform various different options depending on the particular PRB indicated for the mobile device 104.

The memory 310 can be a computer-readable storage medium storing computer-executable instructions and/or information configured to perform one or more of the functions described herein with reference to the mobile device 104. For example, in some embodiments, the memory 310 can store computer-readable storage media associated with determining one or more RE patterns, determining a PRB assigned to the mobile device 104, etc. The processor 312 can perform one or more of the functions described herein with reference to the mobile device 104.

One or more embodiments described herein can include systems, apparatus, methods and/or machine-readable storage media that can facilitate RE mapping for efficient use of the downlink control channel in a 5G wireless communication system are provided herein. In particular, one or more embodiments described herein can provide a hybrid signaling method to configure PDSCH RE mapping. In various embodiments described herein, one or more bitmaps can be employed to indicate REs (in some cases, to indicate every RE) for a physical resource block (PRB) and provide forward compatibility for legacy and non-legacy mobile devices. In one or more embodiments, the RE mapping pattern defined for a PRB can differ from one PRB to another PRB such that all PRBs need not have the same RE mapping pattern.

Going forward, in other embodiments, if there is a need to design a new reference signal that will occupy some REs in the PRB, the network and/or BS device 102 can block those REs by configuring a new RE mapping pattern to a legacy mobile device. So, although the legacy mobile device is not aware of the new reference signal, the legacy mobile device can avoid the REs used by those reference signals for the downlink data transmission to the mobile device.

One or more embodiments can flexibly allow per PRB based PDSCH RE mapping pattern, which means different PRB can have different RE mapping patterns. Also, one or more embodiments can provide signaling overhead that is acceptable.

The system 100 can provide and/or facilitate the hybrid signaling approach to configure PDSCH RE mapping. LTE physical downlink shared channel (PDSCH) resource element (RE) mapping scheme was designed to mapping around known signals and other channels. Correspondingly, the signaling referred to herein as the first type of signaling was designed to indicate the configurations of those RS and/or channels so the mobile device implicitly knows the RE locations. e.g. the RE mapping pattern for a given parameter set can be implicitly derived from the following parameters: crs-PortsCount-r11; crs-FreqShift-r11; mbsfn-SubframeConfigList-r11; csi-RS-ConfigZPId-r11; pdsch-Start-r11; qcl-CSI-RS-ConfigNZPId-r11 and/or zeroTxPowerCSI-RS2-r12.

In particular, in some embodiments, a first type of signaling can be an approach in which the BS device 102 can configure PDSCH RE mapping pattern by signaling to the mobile device 104 the configuration of one or more known RS and/or channels. This signaling can be mandatory and can be performed anytime the hybrid signaling approach is performed.

For example, in various embodiments, in the first type of signaling, the BS device 102 can signal the configuration of one or more of the 5G CORESET configurations, the 5G CSI-RS configurations. the 5G PDSCH starting symbols, the 5G PDSCH ending symbols (e.g., mini-slot embodiments) and/or LTE RS configuration. In one or more embodiments, the BS device 102 can provide for a signaling design scheme for configuring PDSCH RE mapping. In one or more embodiments, the first type of signaling can include the configuration of known RS and/or channels as one type of signaling and the third type of signaling can include per PRB group based bitmap signaling as another type of signaling. One or more embodiments can provide future mobile device compatibly while keep signaling overhead low.

Figure 4:
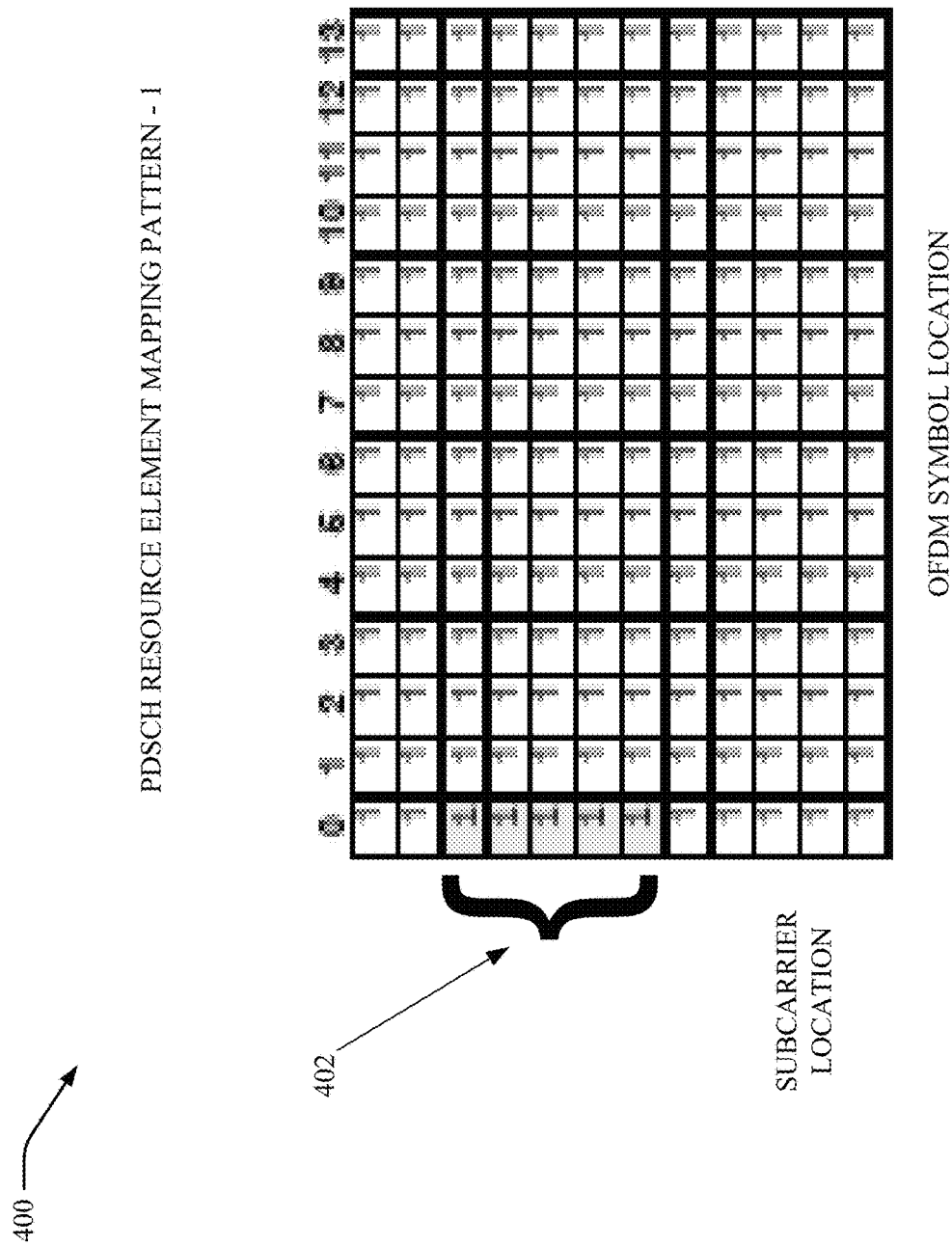
Figure 5:
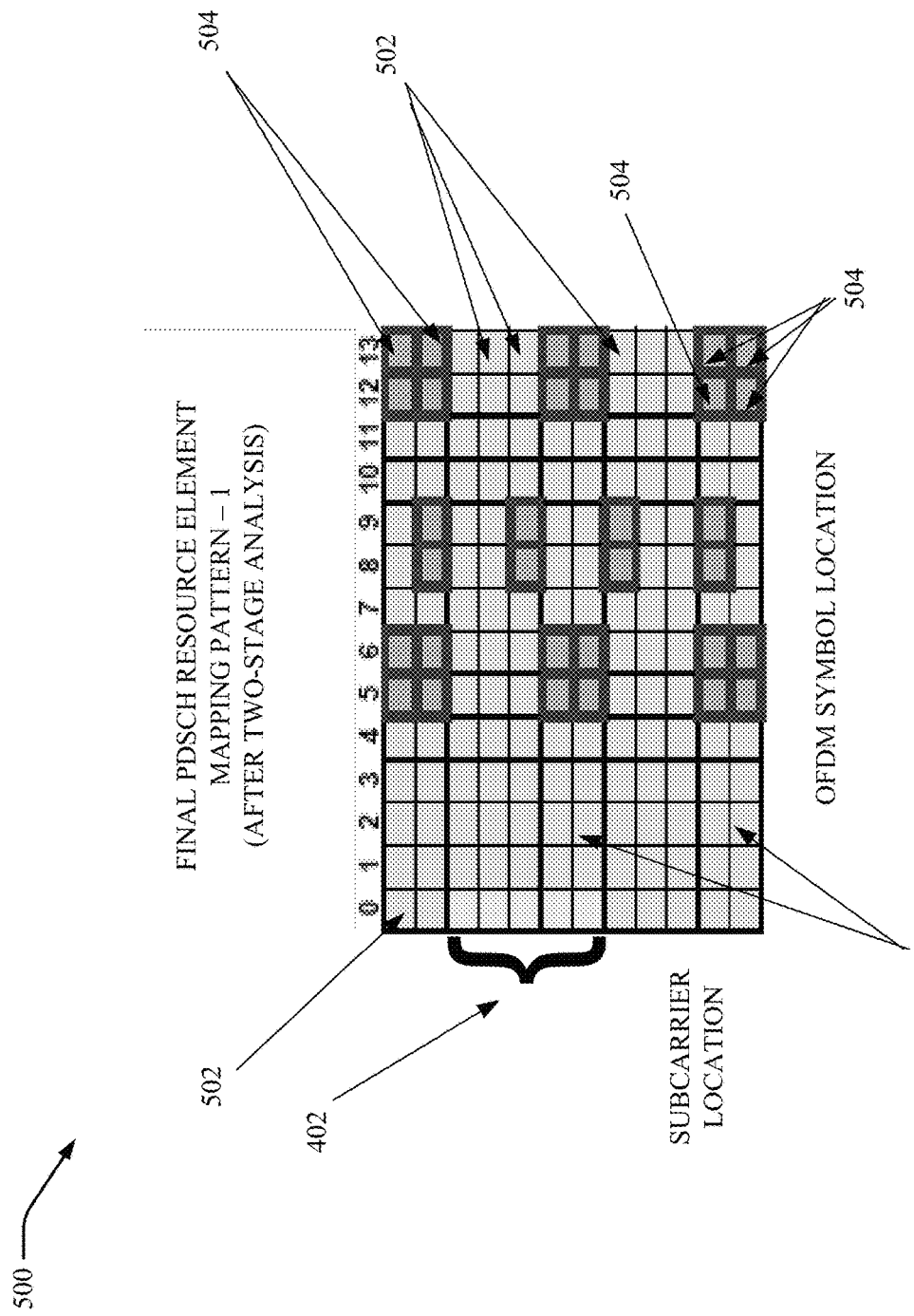
Figure 6:
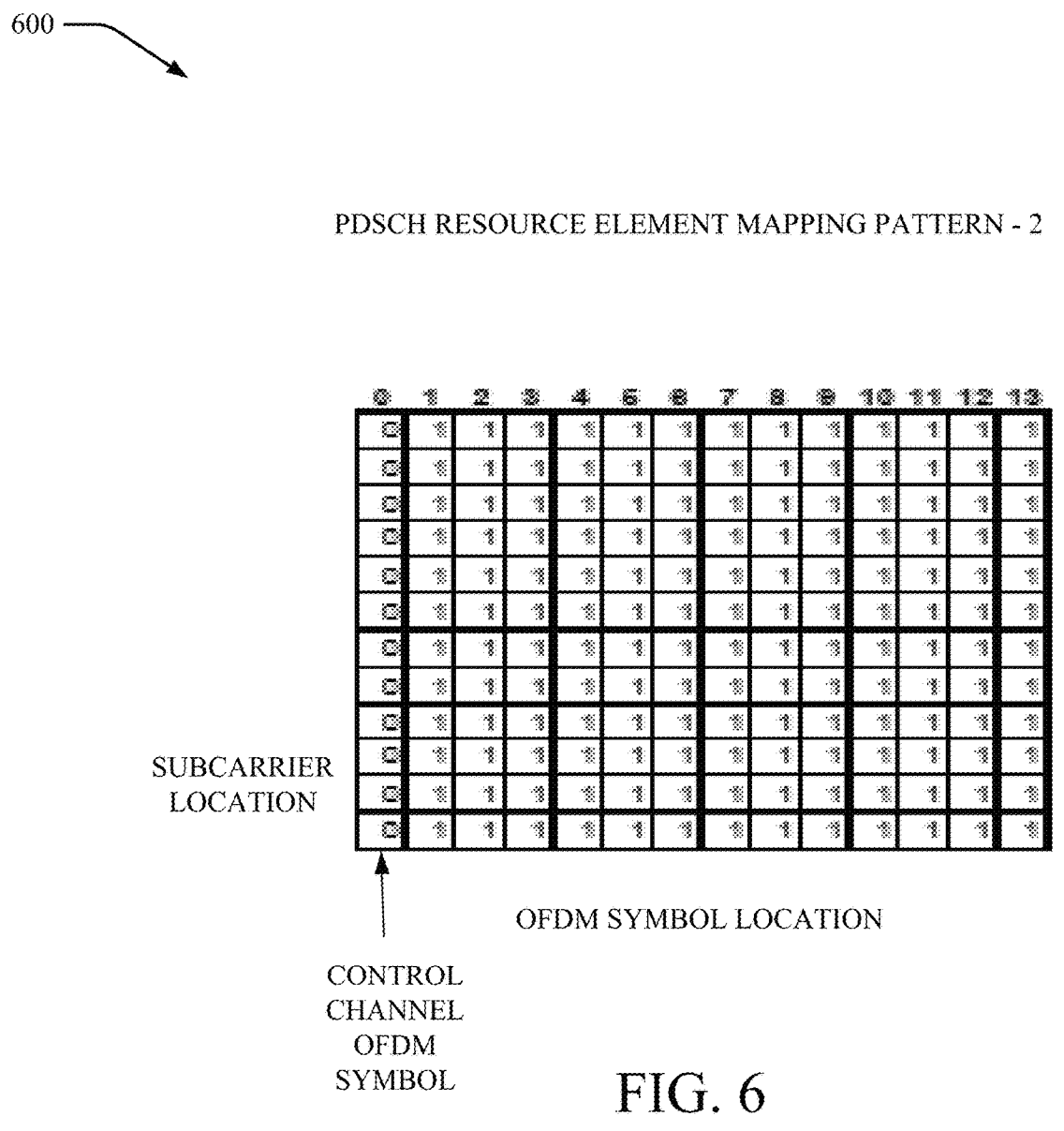
Figure 7:
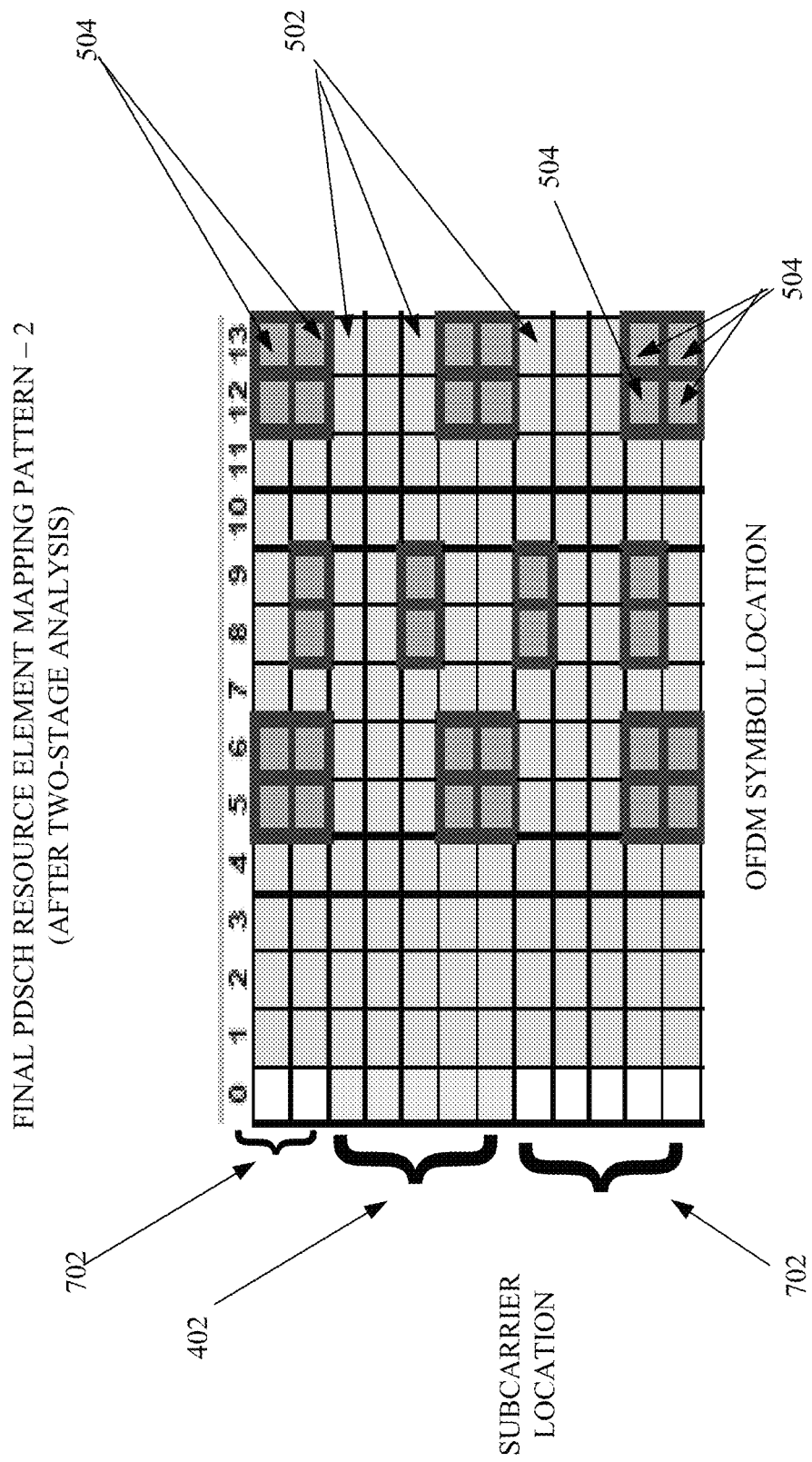

The first type of signaling can be described with reference to FIGS. 4, 5 and/or 6 while the second type of signaling can be described with reference to FIG. 7. FIGS. 4, 5, 6 and 7 illustrate example, non-limiting RE mapping patterns that can be employed to facilitate RE mapping for efficient use of the downlink control channel in accordance with one or more embodiments described herein. Repetitive description of like elements employed in other embodiments described herein is omitted for sake of brevity.

The mobile device 104 can be configured with and/or store two or more different RE patterns. The different RE patterns can indicate which OFDM symbol subcarriers that are associated with control channels on the downlink can be employed for transmission of data. In various embodiments, different RE patterns can be configured by the BS device 102 and/or the control device 200. The RE patterns can be configured differently from time to time and the set of RE patterns configured for the mobile device 104 can therefore be dynamically changed based on any number of factors. For example, in some embodiments, if the control device 200 or BS device 102 determines that one or more control channel subcarriers are being routinely unused (or have a use rate less than a defined threshold, for example), the control device 200 or BS device 102 can indicate the control channel OFDM symbol subcarriers that are unused as those that can be employed for data transmission for one or more subsequent downlink control channel transmissions.

As described, the different RE patterns can indicate control channel symbol subcarriers over which data can be transmitted and control channel symbol subcarriers over which control channel information can be transmitted. For example, as shown in FIG. 4, the first pattern 400 shows that the RE pattern determination component initially transmits an RE pattern 400 to the mobile device 104 showing that any RE (combination of OFDM symbol and subcarrier) can be employed to transmit data. Thus, the resource element pattern selection component 306 of the mobile device 104 can determine that the control channel (e.g., symbol location 0) is indicated by the RE pattern determination component 204 as being able to be fully utilized to transmit data on any of the OFDM symbol location 0 subcarriers. Such is shown by populating each RE with the value "1," for example, in FIG. 4. In some embodiments, REs 402 can be employed for downlink control channel information and the other subcarriers associated with the control channel (e.g., associated with OFDM symbol location 0 that are not included in the subset of REs represented by 402) can be employed for data transmission on the downlink to the mobile device 104.

However, in some of the embodiments described herein, the resource element pattern selection component 306 of the mobile device 104 can have a two-stage evaluation process that can be performed by the mobile device 104 upon receipt of the RE pattern 400 to determine which REs can actually be used for reception of data. The two-stage analysis can be as follows. The RE pattern 400 can be received by the mobile device 104. The resource element pattern selection component 306 of the mobile device 104 can determine the REs on which data can be received based on the RE pattern 400 and one or more different criteria. The resource element pattern selection component 306 of the mobile device 104 can determine: 1) whether data should/will actually be received on any REs based on which REs are indicated in the initial RE pattern (e.g., patterns 400, 600) are indicated as being available for data reception; 2) whether there are any reference signals received on the RE (in actuality) or that the mobile device 104 expects to be received on the RE OR if there are any control channels that the mobile device 104 does or will use for its own control information (e.g., mobile device control information).

In step two of the analysis, if a RE is indicated as being associated with receipt of a reference signal (current or future receipt), such RE will not be employed for receipt of data notwithstanding such can be indicated as a candidate RE for receipt of data at such RE by the mobile device 104. Based on the analysis, the resource element pattern selection component 306 of the mobile device 104 can update the RE pattern 400 to generate a new, modified RE pattern 500 that is a modified version of RE pattern 400 resultant from the two-stage analysis (or to generate information indicating on which REs data indicated as being able to be received in RE pattern 400 will not actually be received). As shown in FIG. 5, RE pattern 400 can be modified to RE pattern 500 to indicate the dark gray REs (some of which are shown labeled with reference numeral 504) are those associated with reference signals and therefore notwithstanding RE pattern 400 indicates value "1" for those REs, no data can be received on those REs. As also shown in FIG. 5, yellow REs (some of which are shown labeled with reference numeral 502) are those on which data can be received. The REs shown as green REs (which are shown as reference numeral 402) can be employed for receipt of control channel information in some embodiments (or data can be received at one or more of these locations in other embodiments).

In step two of the analysis, although not shown, mobile device 104 can also determine if there are any control channels that the mobile device 104 does or will use for its own control information (e.g., mobile device control information). If the mobile device 104 determines that any such REs are or will be used for the mobile device control information, mobile device 104 can generate a new, modified RE pattern that is a modified version of RE pattern 400 resultant from the two-stage analysis (or to generate information indicating on which REs data indicated as being able to be received in RE pattern 400 will not actually be received).

Original RE pattern 600 can be determined and sent to the mobile device 104 by the control device 200 or BS device 102. As shown, in the case of RE pattern 600, none of the REs for the subcarriers on the OFDM symbol are allocated for data. As such, these subcarriers cannot be employed for data transmission. The RE pattern 700 can be determined based on the two-stage analysis described above with regard to various criterion associated with reference signals, mobile device control channel information or any number of other criteria.

In some embodiments, after performing the first type of signaling, the control device 200 and/or BS device 102 can select between employing the second type or the third type of signaling. The second type of signaling is shown and described with reference to FIGS. 7 and 8. Turning to FIG. 7, shown is an RE mapping pattern for only one PRB. In the second type of signaling, the same RE mapping pattern will be applied to all of the PRBs in the embodiments shown in FIGS. 7 and 8.

Figure 8:
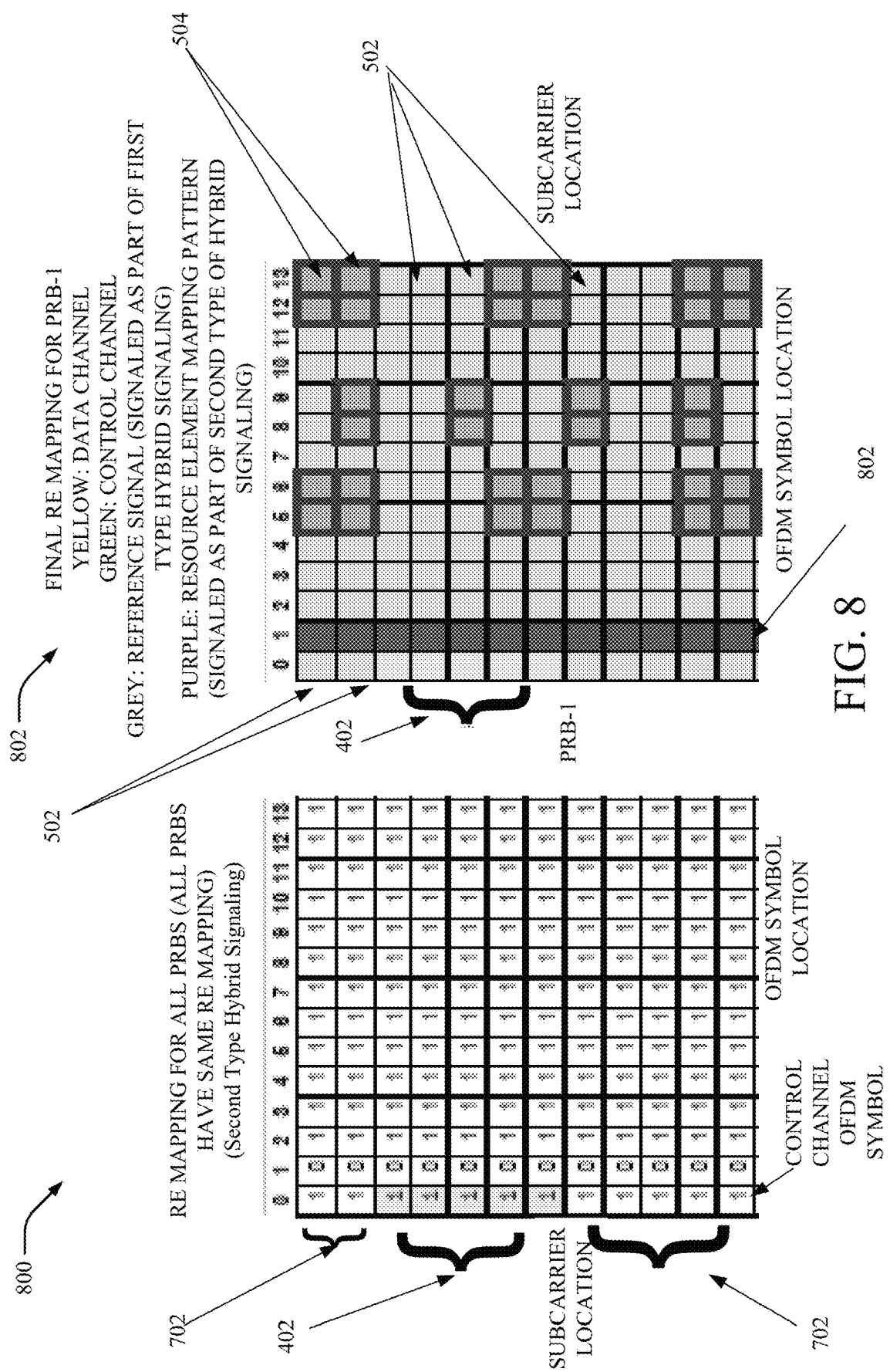
FIG. 8 illustrates another example, non-limiting RE mapping pattern that can be employed to facilitate RE mapping for efficient use of the downlink control channel in accordance with one or more embodiments described herein.

FIGS. 7 and 8 show a first RE mapping pattern for all PRBs and indicate the second type of signaling. When needed, the BS device 102 can configure PDSCH RE mapping using a bitmap in the second type of signaling. For example, in the second type of signaling, the BS device 102 can configure PDSCH RE mapping using a bitmap in lieu of signaling the configuration of one or more known RS and/or channels. In the second type of signaling, one or more bits (or, in some embodiments, each bit) can represent one RE. In some embodiments, each bit represents one RE. As indicated in FIG. 8, the same PDSCH RE mapping pattern can apply to all PRBs. For example, in FIG. 8, 802 (which is shown as purple bits) shows the RE mapping pattern, which can be signaled as part of the second type of signaling.

Accordingly, one or more of these embodiments can be employed for transmission of data on ODFM control channel symbol locations typically reserved for control channel information. In some embodiments, as shown, symbol locations typically employed for data transmission (e.g., one or more of OFDM symbol locations 1-13) can be employed for mobile device control channel information and/or reference signals.

As described, in some embodiments, even if the RE pattern indicates an RE can be used for data or for PDSCH, the mobile device 104 may not use the RE for data in several conditions. For example, in the first type of signaling, the same RE can be used by a reference signal configured to that particular mobile device 104 (e.g., the CSI-RS or DMRS configured by the mobile device 104). In another case, the same RE can be used by the control channel for mobile device 104 (e.g., when the mobile device 104 successfully decodes the control channel, the mobile device can exclude the REs used for the control channel from PDSCH even if the RE Pattern (e.g., DCI) indicates those REs can be used for PDSCH). In some embodiments, the mobile device 104 can do PDSCH RE mapping (and therefore receive information) on all allocated PRBs (indicated in the DCI signaling) following the RE mapping pattern.

Accordingly, one or more embodiments can provide for mobile device specific dynamic PDSCH RE mapping to allow for flexible multiplexing of data and control. Accordingly, in one or more embodiments, a semi-static and/or dynamic signaling framework for the PDSCH RE mapping can be provided. Multiple RE mapping patterns can be configured semi-statically to the mobile device 104 prior to operation and/or can be updated from time to time. Then the BS device 102 can dynamically indicate one pattern to use in a current (and, in some embodiments, a future) PDSCH transmission. The RE mapping pattern can be in the format of two-dimensional bitmap, which can indicate REs in any OFDM symbols or subcarriers. Such flexible signaling framework allows dynamic sharing of the REs between control and data channel. Also, since the legacy UE can be configured to map the PDSCH around any arbitrary REs, future releases/versions of wireless communication systems (and mobile devices that utilize such) can introduce new features occupying some REs without considering the negative implications of such.

In some embodiments, the control device 200 or BS device 102 can optionally employ a second type or a third type of signaling. In the first type of signaling, the control device 200 or BS device 102 transmit information to the mobile device 104 telling the mobile device 104 RE mapping based on known RSs. In the second type of signaling, the control device 200 or BS device 102 can transmit information indicating the single PRB for the RE mapping.

Figure 9:
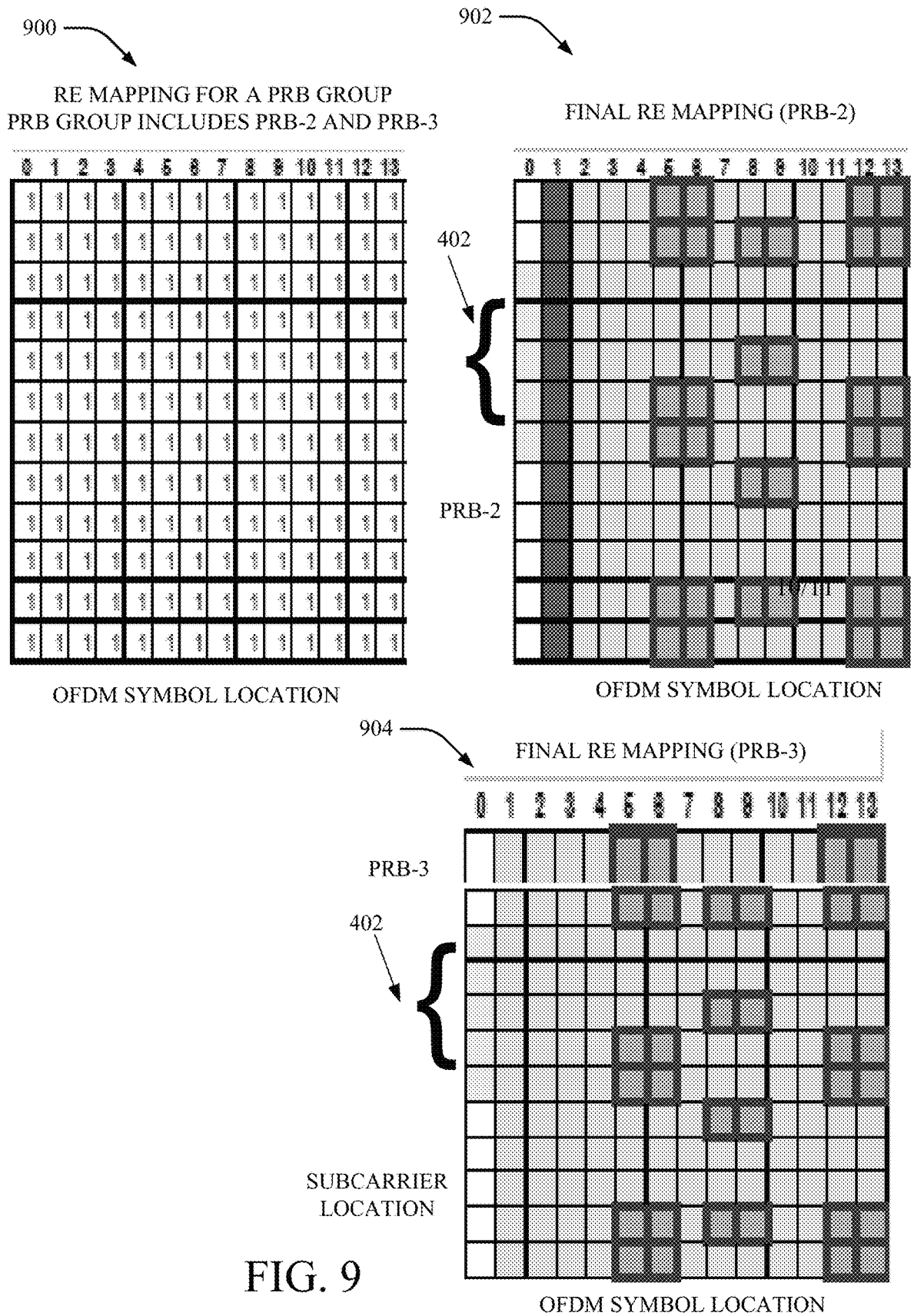
FIG. 9 illustrate example, non-limiting RE mapping patterns for multiple PRBs and that can be employed to facilitate RE mapping for efficient use of the downlink control channel in accordance with one or more embodiments described herein.

FIG. 9 illustrates example, non-limiting RE mapping patterns for multiple PRBs and that can be employed to facilitate RE mapping for efficient use of the downlink control channel in accordance with one or more embodiments described herein. For example, FIG. 9 illustrates RE mapping patterns for the third-type of signaling. Repetitive description of like elements employed in other embodiments described herein is omitted for sake of brevity.

Shown at 900 is an RE mapping for a PRB group including PRB-2 and PRB-3. The PRB-2 is indicated at 902 and the PRB-3 is indicated at 904. It is to be noted that RE mapping shown at 800 of FIG. 8 can be for PRB-1 (which is shown at 802 of FIG. 8) while RE mapping shown at 900 of FIG. 9 can differ from the RE mapping shown at FIG. 8 and can be associated with PRB-2 (shown at 902) and PRB-3 (shown at 904). Thus, in one or more embodiments described herein (e.g., the third type of signaling) a single RE mapping pattern can be employed to represent multiple PRBs selected as part of a PRB group in lieu of transmitting a single RE mapping pattern for each PRB. In FIGS. 8 and 9, in this case PRB-2 and PRB-3 are selected as part of a first group while PRB-1 is or is part of a second group).

Accordingly, in lieu of employing optional second type of signaling in which the RE mapping is provided for all PRBs as indicated in FIG. 8, the control device 200 and/or BS device 102 can employ a third type of signaling in one or more embodiments described herein and shown in FIG. 9. For example, in some embodiments, the third type of signaling allows the control device 200 and/or BS device 102 to configure another PRB RE mapping different from that shown in FIGS. 7 and 8 to result in configuration of multiple PRBs within a PRB group as shown in FIG. 9. Accordingly, the PRB of FIG. 8 (e.g., PRB-1) can have one associated RE mapping pattern, the PRB of FIG. 9A (e.g., PRB-2) can have a second RE mapping pattern, which as shown, is different from the mapping pattern associated with PRB-1.

In particular, the control device 200 and/or BS device 102 can employ different RE mapping patterns for different ones of PRBs or, for greater system efficiently, the control device 200 and/or BS device 102 can employ different RE mapping patterns for different groups of PRBs as shown in FIG. 9.

In some embodiments, the third type of signaling approach can employ the BS device 102 configuring one or more multiple PRB or PRB group-specific PDSCH RE mapping pattern in a bitmap. This configuration can overwrite the RE mapping pattern from at least a portion of the second type of signaling. For example, in some embodiments, the third type of signaling can configure one or multiple PRB or a PRB group specific PDSCH RE mapping pattern in a bitmap. Accordingly, one or more embodiments of the third type of the hybrid signaling approach can save signaling overhead while providing PRB level flexible signaling.

By way of example, but not limitation, the control device 200 and/or BS device 102 can transmit signaling that can first determine/configure two or more groups of PRBs (e.g., by the index of starting and ending PRBs). Then the control device 200 and/or BS device 102 can transmit a bitmap of PDSCH RE mapping for each group of PRBs (one bitmap per PRB group). Accordingly, in the third type of signaling, the control device 200 and/or BS device 102 can configure different PRB groups (e.g., a first PRB group could be PRB-1, PRB-2, PRB-3, PRB 40) then configure one bitmap for that first PRB group. The control device 200 and/or BS device 102 can then configure a second PRB group (e.g., PRB 41, PRB 42, . . . PRB 50) and configured only one bitmap for that second PRB group. Each PRB group can have an associated RE mapping pattern distinct from other RE mapping patterns for other groups. Accordingly, the embodiments of the third type of signaling need only utilize a defined number of bitmaps (which would be equal to the number of the PRB groups). In the example provided, the third type of signaling need only include two bitmaps instead of 50 bitmaps, for example.

In various different embodiments, the BS device 102 and/or control device 200 can select to perform the first and second types of signaling; the first and second types of signaling with overriding of a portion of the second type of signaling information with third type of signaling; and/or a first and third type of signaling. In some embodiments, the selection of the type of signaling to perform can be based on a determination by the control device 200 or BS device 102 regarding the type of mobile devices being served by the BS device 102 (e.g., if there are only legacy mobile devices then first and second types of hybrid signaling can be employed without resort to the third type of signaling).

In some embodiments, the control device 200 and/or BS device 102 can determine the RE pattern that one or more mobile devices will recognize. The control device 200 and/or BS device 102 can then transmit information to configure an RE mapping pattern that can accommodate numerous (or, in some embodiments, a majority) of mobile devices as the second type of signaling. A single PRB can be assigned to the RE mapping. The control device 200 and/or BS device 102 can override such PRB for selected mobile devices in the third type of signaling. These selected mobile devices can be mobile devices that need different PRB. As such, after the third type of signaling, there can be different PRB groups with different RE mappings.

In some embodiments described herein can, in lieu of configuring RE mapping pattern for every PRB, group the PRBs and after grouping signal one RE mapping for the configured group. In some embodiments described herein, accordingly, the signaling is PRB-based (a signal can be transmitted to an entire PRB and/or the RE mapping can be for a particular PRB). In some embodiments, a previous configuration of RE mapping in association with one PRB for all mobile devices can be optionally overwritten to provide for multiple PRBs within the group that was initially a single PRB in the second type of signaling.

In some embodiments, if the RE mapping is common across all PRB in bandwidth then the control device 102 and/or the BS device 102 employs only first and second type of signaling. If not, the control device 200 and/or BS device 102 employ first and third type of signaling.

Figure 10:
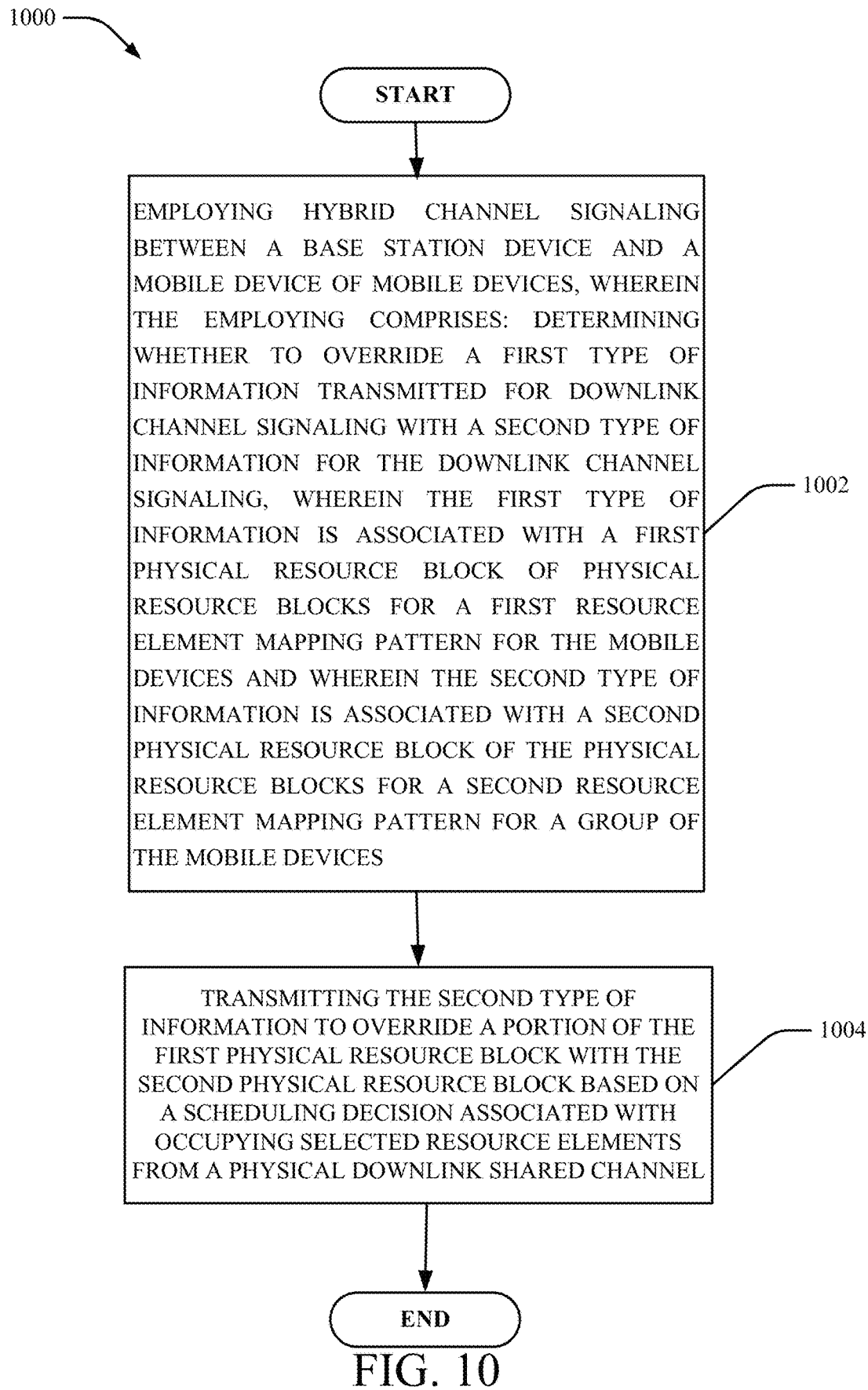
FIGS. 10 and 11 illustrate flowcharts of methods that facilitate RE mapping for efficient use of the downlink shared channel in accordance with one or more embodiments described herein.
Figure 11:
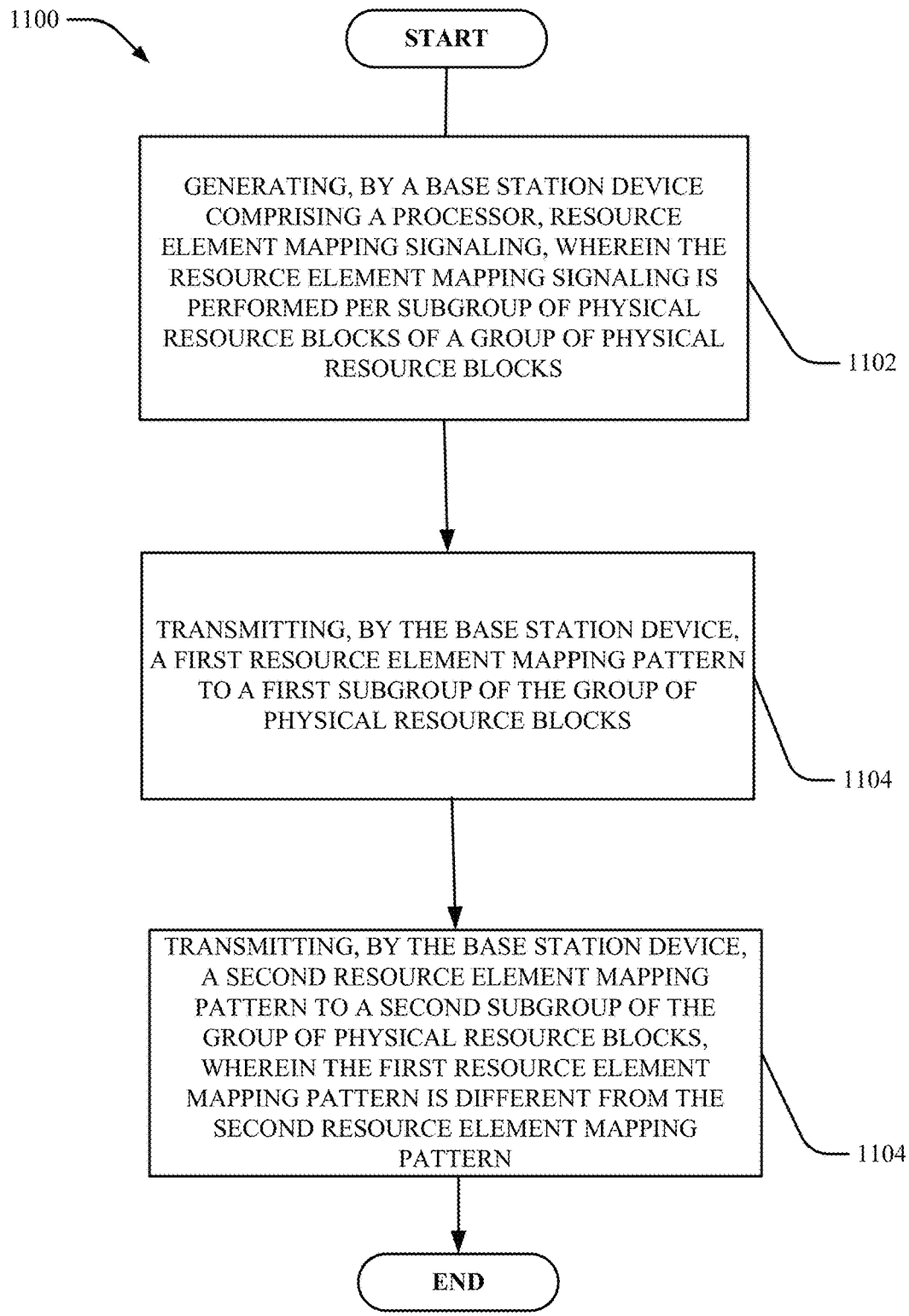

FIGS. 10 and 11 illustrate flowcharts of methods that facilitate RE mapping for efficient use of the downlink shared channel in accordance with one or more embodiments described herein. Turning first to FIG. 10, at 1002, method 1000 can comprise employing hybrid channel signaling between a base station device and a mobile device of mobile devices, wherein the employing comprises: determining whether to override a first type of information transmitted for downlink channel signaling with a second type of information for the downlink channel signaling, wherein the first type of information is associated with a first physical resource block group of physical resource blocks for a first resource element mapping pattern for the mobile devices and wherein the second type of information is associated with a second physical resource block group of the physical resource blocks for a second resource element mapping pattern for a group of the mobile devices.

At 1004, method 1000 can comprise transmitting the second type of information to override a portion of the first physical resource block with the second physical resource block based on a scheduling decision associated with occupying selected resource elements from a physical downlink shared channel.

Although not shown, in some embodiments, the method can comprise transmitting the second type of information to override a portion of the first physical resource block group with the second physical resource block group based on a determination that the group of the mobile devices fails to satisfy a defined criterion. In some embodiments, the defined criterion is associated with whether the subgroup of mobile devices can receive a signal on one or more subbands of a channel over which the base station device is transmitting.

In some embodiments, although not shown, method 1000 can also comprise transmitting a first bitmap of resource element mapping for the first physical resource block and transmitting a second bitmap of resource element mapping for the second physical resource block.

In some embodiments, although not shown, employing hybrid channel signaling further comprises: transmitting a configuration of a known reference signal from the base station device to the mobile device, and wherein the transmitting the configuration is performed prior to the determining whether to override the first type of information transmitted for downlink channel signaling with the second type of information for the downlink channel signaling.

Turning now to FIG. 11, at 1102, method 1100 can comprise generating, by a base station device comprising a processor, resource element mapping signaling, wherein the resource element mapping signaling is performed per subgroup of physical resource blocks of a group of physical resource blocks. At 1104, method 1100 can comprise transmitting, by the base station device, a first resource element mapping pattern to a first subgroup of the group of physical resource blocks.

At 1106, method 1106 can comprise transmitting, by the base station device, a second resource element mapping pattern to a second subgroup of the group of physical resource blocks, wherein the first resource element mapping pattern is different from the second resource element mapping pattern. In some embodiments, the first subgroup is mutually exclusive of the second subgroup.

In some embodiments, prior to the generating, the method comprises determining, by the base station device, a first subgroup of mobile devices of a group of mobile devices for the first subgroup of the group of physical resource blocks and determining, by the base station device, a second subgroup of mobile devices of a group of mobile devices for the second subgroup of the group of physical resource blocks.

In some embodiments, the determining the first subgroup of mobile devices and the determining the second subgroup of mobile devices comprises determining which ones of the mobile devices are configured to received a defined type of signal transmission.

Figure 12:
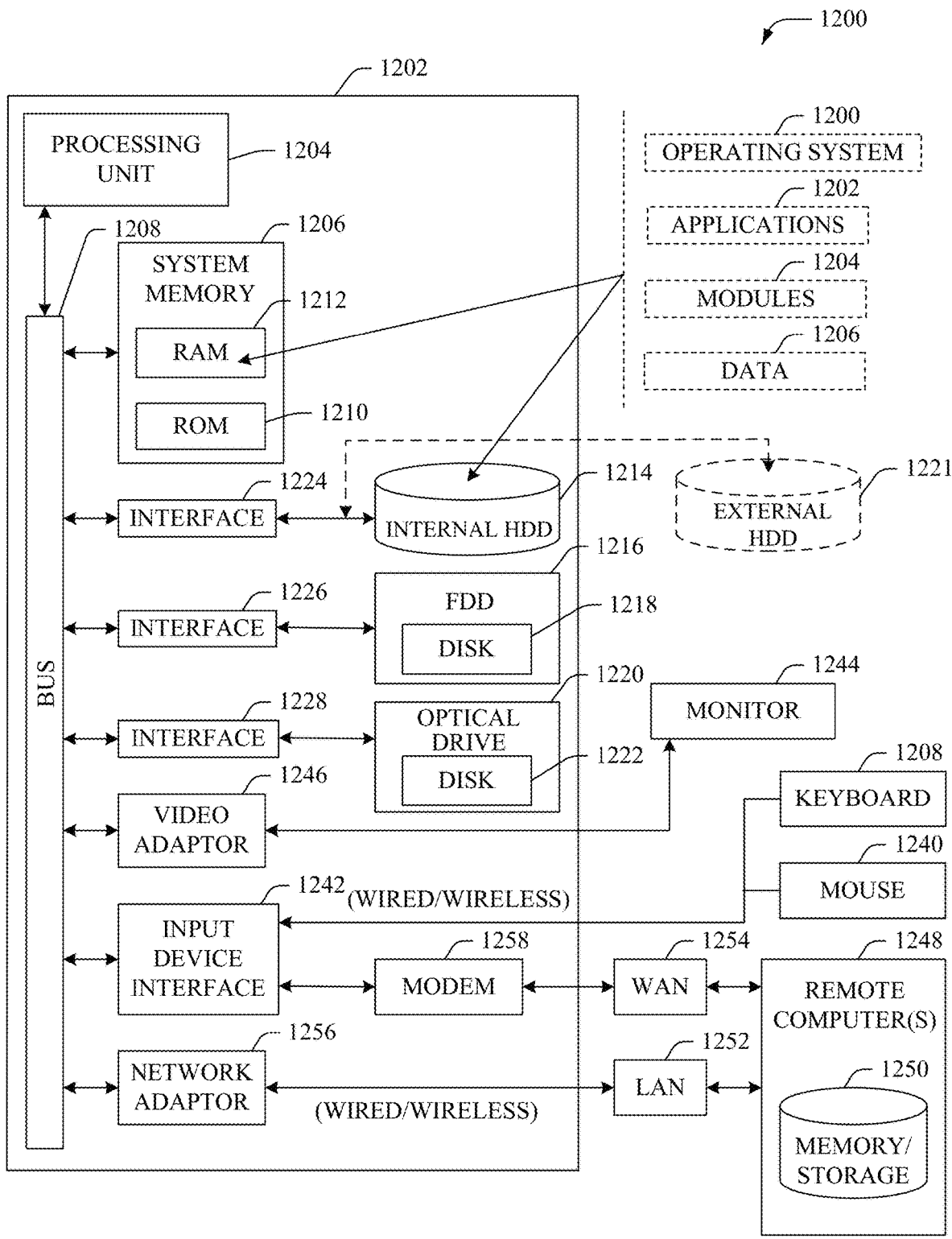
FIG. 12 illustrates a block diagram of a computer that can be employed in accordance with one or more embodiments described herein.

FIG. 12 illustrates a block diagram of a computer that can be employed in accordance with one or more embodiments. Repetitive description of like elements employed in other embodiments described herein is omitted for sake of brevity.

In some embodiments, the computer, or a component of the computer, can be or be comprised within any number of components described herein comprising, but not limited to, base station device 102 or mobile device 104 (or a component of base station device 102 or mobile device 104). In order to provide additional text for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 12, the example environment 1200 for implementing various embodiments of the embodiments described herein comprises a computer 1202, the computer 1202 comprising a processing unit 1204, a system memory 1206 and a system bus 1208. The system bus 1208 couples system components comprising, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 comprises ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also comprise a high-speed RAM such as static RAM for caching data.

The computer 1202 further comprises an internal hard disk drive (HDD) 1210 (e.g., EIDE, SATA), which internal hard disk drive 1214 can also be configured for external use in a suitable chassis (not shown), a magnetic floppy disk drive 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface, respectively. The interface 1224 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1202, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1212, comprising an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

A communication device can enter commands and information into the computer 1202 through one or more wired/wireless input devices, e.g., a keyboard 1238 and a pointing device, such as a mouse 1240. Other input devices (not shown) can comprise a microphone, an infrared (IR) remote control, a joystick, a game pad, a stylus pen, touch screen or the like. These and other input devices are often connected to the processing unit 1204 through an input device interface 1242 that can be coupled to the system bus 1208, but can be connected by other interfaces, such as a parallel port, an IEEE 1394 serial port, a game port, a universal serial bus (USB) port, an IR interface, etc.

A monitor 1244 or other type of display device can be also connected to the system bus 1208 via an interface, such as a video adapter 1246. In addition to the monitor 1244, a computer typically comprises other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically comprises many or all of the elements described relative to the computer 1202, although, for purposes of brevity, only a memory/storage device 1250 is illustrated. The logical connections depicted comprise wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also comprise a wireless AP disposed thereon for communicating with the wireless adapter 1256.

When used in a WAN networking environment, the computer 1202 can comprise a modem 1258 or can be connected to a communications server on the WAN 1254 or has other means for establishing communications over the WAN 1254, such as by way of the Internet. The modem 1258, which can be internal or external and a wired or wireless device, can be connected to the system bus 1208 via the input device interface 1242. In a networked environment, program modules depicted relative to the computer 1202 or portions thereof, can be stored in the remote memory/storage device 1250. It will be appreciated that the network connections shown are example and other means of establishing a communications link between the computers can be used.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 12 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x_1, x_2, x_3, x_4, \ldots, x_n)$, to a confidence that the input belongs to a class, that is, $f(x)=\text{confidence(class)}$. Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. An apparatus, comprising:
a processor; and
a memory that stores executable instructions that, when executed by the processor, facilitate performance of operations, comprising:
employing hybrid channel signaling between a base station device and a mobile device of mobile devices, wherein the employing comprises determining whether to override a first type of information transmitted for downlink channel signaling with a second type of information for the downlink channel signaling, wherein the first type of information is associated with a first physical resource block group of physical resource blocks for a first resource element mapping pattern for the mobile devices; and
transmitting the second type of information.

2. The apparatus of claim 1, wherein the first resource element mapping pattern is distinct from a second resource element mapping pattern for the mobile devices.

3. The apparatus of claim 2, wherein the operations further comprise transmitting a first bitmap of a first resource element mapping for the first physical resource block group.

4. The apparatus of claim 3, wherein the operations further comprise transmitting a second bitmap of a second resource element mapping for a second physical resource block group of the physical resource blocks.

5. The apparatus of claim 1, wherein the employing the hybrid channel signaling further comprises:
transmitting a configuration of a known reference signal from the base station device to the mobile device.

6. The apparatus of claim 1, wherein the second type of information is transmitted to override a portion of the first physical resource block group with a second physical resource block group of the physical resource blocks.

7. A method, comprising:
facilitating, by a base station device comprising a processor, transmitting a first resource element mapping pattern to a first subgroup of a group of physical resource blocks; and
facilitating, by the base station device, transmitting a second resource element mapping pattern to a second subgroup of the group of physical resource blocks, wherein the first resource element mapping pattern is different from the second resource element mapping pattern.

8. The method of claim 7, further comprising:
determining, by the base station device, a first subgroup of mobile devices of a group of mobile devices for the first subgroup of the group of physical resource blocks.

9. The method of claim 8, further comprising:
determining, by the base station device, a second subgroup of mobile devices of the group of mobile devices for the second subgroup of the group of physical resource blocks.

10. The method of claim 9, wherein the determining the first subgroup of mobile devices and the determining the second subgroup of mobile devices comprises determining which ones of the mobile devices are configured to receive a defined type of signal transmission.

11. A machine-readable storage medium, comprising executable instructions that, when executed by a processor, facilitate performance of operations, comprising:
determining whether to override a first type of information transmitted with a second type of information, wherein the first type of information is associated with a first physical resource block of physical resource blocks; and
in response to the determining indicating to override the first type of information, transmitting the second type of information to override the first type of information.

12. The machine-readable storage medium of claim 11, wherein the transmitting is based on a scheduling decision associated with transmitting at resource elements from a physical downlink shared channel.

13. The machine-readable storage medium of claim 11, wherein the second type of information is associated with a second physical resource block of the physical resource blocks for a second resource element mapping pattern for a group of devices.

14. The machine-readable storage medium of claim 11, wherein the operations further comprise transmitting a first bitmap of a first resource element mapping for the first physical resource block.

15. The machine-readable storage medium of claim 14, wherein the operations further comprise transmitting a second bitmap of a second resource element mapping for the second physical resource block.

16. The machine-readable storage medium of claim 11, wherein the operations further comprise:
transmitting a configuration of a known reference signal from a base station device comprising the processor to a device.

17. The machine-readable storage medium of claim 16, wherein the transmitting the configuration is performed prior to the determining whether to override the first type of information with the second type of information.

18. The machine-readable storage medium of claim 11, wherein the transmitting comprising transmitting the second type of information to a mobile device to override the first type of information at the mobile device.

19. The machine-readable storage medium of claim 11, wherein the first type of information is associated with a first physical resource block group of physical resource blocks for a first resource element mapping pattern for mobile devices, and wherein the second type of information is associated with a second physical resource block group of physical resource blocks for a second resource element mapping pattern for the mobile devices.

20. The machine-readable storage medium of claim 19, wherein the first resource element mapping pattern is distinct from the second resource element mapping pattern.

\* \* \* \* \*